(12) United States Patent
Sokolov

(10) Patent No.: US 6,879,732 B1
(45) Date of Patent: Apr. 12, 2005

(54) NOISE REDUCTION IN IMAGES

(75) Inventor: Skiff Sokolov, Lidingö (SE)

(73) Assignee: XCounter AB, Danderyd (SE)

( * ) Notice: Subject to any disclaimer, the term of this patent is extended or adjusted under 35 U.S.C. 154(b) by 809 days.

(21) Appl. No.: 09/716,253

(22) Filed: Nov. 21, 2000

(30) Foreign Application Priority Data

Oct. 6, 2000 (SE) .............................................. 0003608

(51) Int. Cl.$^7$ ................................................ G06K 9/40
(52) U.S. Cl. ..................... 382/275; 382/130; 348/607
(58) Field of Search ................................. 382/130, 236, 382/254, 263–264, 268–269, 272, 275; 348/606–607, 701

(56) References Cited

U.S. PATENT DOCUMENTS

| | | | | |
|---|---|---|---|---|
| 4,807,034 A | * | 2/1989 | Takeuchi et al. ............ | 348/620 |
| 4,937,878 A | * | 6/1990 | Lo et al. ..................... | 382/103 |
| 5,099,329 A | * | 3/1992 | Oyama et al. .............. | 348/620 |
| 5,485,371 A | * | 1/1996 | Ito et al. ....................... | 378/20 |
| 5,771,318 A | | 6/1998 | Fang et al. | |
| 5,959,693 A | | 9/1999 | Wu et al. | |
| 6,049,623 A | * | 4/2000 | Fuderer et al. ............. | 382/131 |
| 6,061,100 A | * | 5/2000 | Ward et al. ................. | 348/607 |

FOREIGN PATENT DOCUMENTS

| | | | |
|---|---|---|---|
| EP | 0961224 A1 | | 12/1988 |
| EP | 0683482 A2 | * | 11/1995 |
| EP | 0689794 A2 | | 1/1996 |
| EP | A1698990 | | 2/1996 |
| EP | 1030268 A1 | | 8/2000 |
| EP | 1093087 A2 | | 4/2001 |
| EP | 1093088 A2 | | 4/2001 |
| GB | 2303511 | | 2/1997 |

OTHER PUBLICATIONS

JP2001008038 A (Fujiphoto Film Co Ltd), Jan. 12, 2001 (Abstract) WorldPatents Index (online). London, U.K.: Derwent Publications, Ltd. (retrieved on Jan. 28, 2002). Retrieved from: EPO WPI Database. DW0118, Accession No. 01–175564, abstract.

Esa Publications Division, Volume, Aug. 1986, V T Tom, "A synergistic approach for multispectral image restoration using reference imagery" pp. 559–564.

* cited by examiner

*Primary Examiner*—Daniel Miriam
(74) *Attorney, Agent, or Firm*—Birch, Stewart, Kolasch, & Birch, LLP.

(57) ABSTRACT

The present invention relates to a method for reduction of noise in an image including a plurality of pixels, comprising averaging pixel values over a region (R), comprising the steps of: adding a selected pixel to the region (R); grouping pixels adjacent the region (R) in pairs, wherein the pixels of each pair being oppositely located with respect to said selected pixel; adding said pairs, pair by pair, to the region (R) in dependence on the squared difference of the selected pixel value from the pairs half sums does not exceed the dispersion (D) of the noise of said difference multiplied by a tolerance level (L); repeating said step of grouping and said step of adding said pairs until that, in said step of adding said pairs, the condition for adding said pairs is not fulfilled for any pair; averaging the pixel values of said region (R); and using the thus averaged pixel value for the selected pixel of said region (R) in reconstruction of said image.

19 Claims, 1 Drawing Sheet

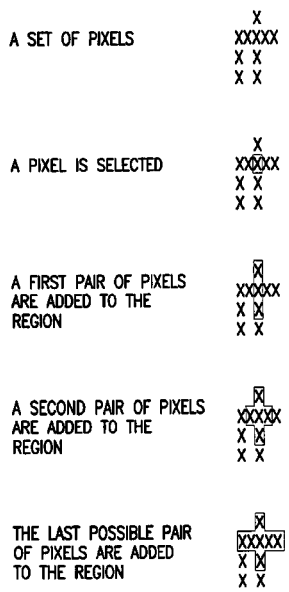

| | |
|---|---|
| A SET OF PIXELS | X<br>XXXXX<br>X X<br>X X |
| A PIXEL IS SELECTED | X<br>XX⊠XX<br>X X<br>X X |
| A FIRST PAIR OF PIXELS ARE ADDED TO THE REGION | X̄<br>XX⊠XX<br>X X̄<br>X X |
| A SECOND PAIR OF PIXELS ARE ADDED TO THE REGION | X̄<br>X̄XXXX̄<br>X X̄<br>X X |
| THE LAST POSSIBLE PAIR OF PIXELS ARE ADDED TO THE REGION | X̄<br>X̄X̄X̄X̄X̄<br>X X̄<br>X X |

FIG.1

NOISE REDUCTION IN IMAGES

FIELD OF INVENTION

The present invention relates generally to noise reduction, and specifically to noise reduction in digital images.

BACKGROUND

All known methods of reduction of high frequency random noise in images reduce to replacement of initial pixel value by some average value over some area near the initial pixel. They differ mainly in the choice of filters, that is in the choice of the weights, with which the pixel values are summed during averaging and in the choice of the summation algorithms saving computing time. The summation algorithms may involve Fourier transformations, but the principle remains the same.

These methods do not distinguish the noise from the useful high-frequency components of the true image and as a consequence they reduce both to the same extent. The noise reduction smears an image, and the fine details of the image, if they were obscured by the noise, become even less visible after the noise reduction. The smearing is an unavoidable consequence of noise reduction, if no additional information about the noise or the image structure is available.

SUMMARY OF THE INVENTION

An object of the present invention is to improve noise reduction in images, and to diminish negative consequences of noise reduction.

This object is among others attained by methods as claimed in claim 1, 6, or 9, and by a computer program product as claimed in claim 16.

An advantage of the present invention is achieved by utilization of different methods in dependence on information known of noise or image structure, whereby improved noise reduction is achieved in accordance with said information.

Further features and advantages of the present invention will be evident from the following description.

BRIEF DESCRIPTION OF DRAWINGS

FIG. 1 illustrates the addition of pixels to a defined region.

DETAILED DESCRIPTION OF EMBODIMENTS

In the following description, for purpose of explanation and not limitation, specific details are set forth, such as particular techniques and applications in order to provide a thorough understanding of the present invention. However, it will be apparent to one skilled in the art that the present invention may be practiced in other embodiment that depart from these specific details. In other instances, detailed descriptions of well-known methods and apparatuses are omitted so as not to obscure the description of the present invention with unnecessary details.

The present invention can, if some additional information about noise or image structure, besides the image itself, is given, be used to improve noise reduction and reduce the image-degrading consequence incurred by the noise reduction. Four important examples of such additional information is the knowledge that an image has one or several of the following properties:

(a) almost all the area of the true image, i.e. of the noise free image, is covered by many-pixel fragments, wherein the intensity is changing smoothly;

(b) the dispersion or other parameters of noise reduction, such as FWHM (full width at half maximum), are approximately known;

(c) the noise in the image is significantly correlated with the noise in other images (or in different parts of the same image); and (d) the image is computed (reconstructed) from source data, which are common to source data of other images.

Most images have property (a), though the sizes and shapes of smooth fragments may vary much from image to image.

Property (b) is valid for most noisy images, including X-ray pictures.

Properties (c) and (d) are valid for most reconstructed images, including tomographic images and maps of bone density reconstructed from dual-energy X-ray images.

Although the noise in an image may be correlated with the noise in other images or portions thereof for many technical reasons, the most frequent cause of such correlation is the origin of images from the same source data. When several images are computed (reconstructed) from the same data, the same initial noise enters into all the computed images thereby making the noise, obtained by reconstruction, correlated.

The noise in reconstructed images is usually strongly amplified compared to the noise in source data and becomes an imminent problem, which can be solved by the methods of the present invention as will be described below. An important example is the calculation of bone and soft tissue densities from two X-ray images of the same part of body, but made with X-rays of different energies. Since the reconstruction of the densities is based on the small differences between such X-ray images, the reconstructed densities are very sensitive to the noise in these source images and the noises in the reconstructed images are relatively large and are strongly correlated with each other.

The properties (a), (b), (c), and (d) give new possibilities of noise reduction which were not fully exploited before.

Methods of noise reduction will be described which using properties (a), (b) (c), and (d) accomplish deeper noise reduction and diminish the smearing consequence incurred by it. Especially deep noise reduction without any smearing of small details is achievable for the reconstructed images when methods using properties (a), (b), (c), and (d) are combined.

Noise in an image is generally any contamination dirt covering the true-image of the object of interest. The shapes of dirt fragments and the statistical properties of dirt may be quite different. The present invention concerns mainly the noise, which looks as dark and light spots or grains scattered over the whole image and covering it densely. If the image of the same or different object is produced again, e.g. another X-ray image taken of a patient, these spots lie at different places in that image than in the first image. The high-frequency noise in pixel images consists of small spots of the size of one or two pixels. Such noise is often seen in images made by high sensitive films and electronic cameras made in conditions of poor illumination or low X-ray flux, when the number of registered photons over a pixel area is not large.

The pixel value p at some point X in a noisy image can be considered as a sum of a mean value P, which the pixel would have in a true image, without noise, and of fluctuation F, wherein the pixel value p is given by the formula:

$$p = P + F.$$

The expression "mean value" is denoted by the symbol M, so that $P = M(p)$, and $M(F) = 0$. The main parameter of such noise, describing its strength, is dispersion D. The dispersion D(X) is defined as a mean value of the squared fluctuation for pixel X, which is given by the formula:

$$D(X)=M(F^2)$$

The quality of an image is usually characterized by the so-called signal-to-noise ratio (S/N), which is actually defined as $P^2/D$. The noise reduction makes the dispersion D smaller and improves S/N.

The mean value M(FG) of the product of fluctuations F, G of two pixel values p=P(X)+F, g=P(Y)+G at different points X, Y (Y may, be the point with same coordinates as X but lying in a different image) is called covariance of values p, g. This quantity together with dispersions of p, g makes 2×2 covariance matrix $$V = \begin{pmatrix} V_{11} & V_{12} \\ V_{21} & V_{22} \end{pmatrix},$$

with elements, $$V_{11}=M(F^2)=D(X),$$

$$V_{12}=V_{21}=M(FG),$$

$$V_{22}=M(G^2)=D(Y).$$

The strength of the mutual dependence of fluctuations F, G is measured by the correlation coefficient C, which is given by the formula:

$$C=V_{12}/\sqrt{V_{11}V_{22}},$$

which may vary from −1 to 1. The values C=−1 and C=1 correspond to complete dependence of fluctuations, so F and G are proportional and by knowing F one may thereby calculate G, and vice versa. The dispersion D of the linear combination $\alpha p+\beta g$ of the pixel values p, g is expressed by the formula:

$$D(\alpha p+\beta g)=\alpha^2 V_{11}+\beta^2 V_{22}+2\alpha\beta V_{12}.$$

The mean value is most often unknown and is approximately estimated by the average value over some number N of independently obtained values $x_i$ of the same quantity x, wherein the average value of x is given by the formula:

$$\mathrm{Avr}(x)=\Sigma x_i w_i/\Sigma w_i,$$

where positive coefficients $w_i$ are weights. If the weights are equal to one, which is adopted if $x_i$ have same accuracy, the average of x is given by the formula:

$$\mathrm{Avr}(x)=\Sigma x_i/N.$$

For example, the true pixel value P(X) at point X may be estimated as Avr(p) of values $p_i$ of pixels at points $Y_i$ in some area around X, if there are reasons to think that true values $P_i$ differ little from P(X), or their deviations from P(X) compensate each other. The dispersion D(X) may be estimated as the average of the squared deviations from Avr(p), which is given by the formula:

$$D(X) \approx \mathrm{Avr}((p-\mathrm{Avr}(p))^2),$$

if there are reasons to think that the noise is of the same strength in the chosen area around X. Similarly, covariance $V_{12}$ may be estimated as:

$$V_{12} \approx \mathrm{Avr}((p-\mathrm{Avr}(p))(g-\mathrm{Avr}(g))).$$

The usual methods of noise reduction replace each pixel of an image by the average value over some area around a pixel. This area together with a table of coefficients, with which the pixel values are summed, is usually called a filter. A simple example of a filter is a square of 9 pixels, the values of which are summed with the same coefficient 1/9.when the average is calculated. Averaging with such filter diminishes the noise dispersion 9 times, but smears the image making each visible line in it 4 pixels wider and correspondingly decreasing its contrast. The methods described in the present invention achieve greater reduction of noise dispersion at the same smearing consequence, or reduce the smearing consequence for the same noise reduction.

A tomographic reconstruction is the calculation of the density of the object on some planes cutting the object using a plurality of X-ray pictures or NMR (Nuclear Magnetic Resonance) data. It is a complex procedure, reconstructing images with correlated noise.

The reconstruction of the densities of the bone and of the soft tissue is more simple and consists of calculation of two functions a(p,g), b(p,g) giving the densities of the bone and soft tissue as functions of pixel values p,g at point X in two X-ray images obtained with X-rays of different energies. The functions a(p,g), b(p,g) are usually obtained from calibration X-ray exposures of objects with known densities of bone and soft tissue equivalents. Both functions are very sensitive to small differences of pixel values p-g, so the calculated densities have larger noise dispersions and worse signal-to-noise ratio than the original X-ray images. The noise in the bone density image is strongly correlated with the noise in the soft tissue density image, where the correlation coefficient C is negative and close to −1.

A first method of noise reduction using property (a) of the true image (presence of smooth fragments) and property (b) of the noise (known dispersion) will now be described.

The first method reduces noise at each point X of an image by averaging the pixel values over a region R, wherein the averaging region R is dependent on X and is selected as the largest region around X, which includes only pairs of pixels Y, Z symmetrically placed with respect to X and having the half sums (p(Y)+p(Z))/2 of values deviating from each other within the limits corresponding to the level of the noise in the image and to a user-defined tolerance preferences L for the noise-reduced image.

The largest averaging region R approximating the optimal one is found as follows.

Firstly, as illustrated in FIG. 1 a selected pixel X is included into the region R(A pixel is selected). Then, the pairs of pixels Y=X−v, Z=X+v, where v is a shift vector, symmetrical with respect to point X and touching the already filled part of the region R, are considered pair by pair and a check is made whether the squared difference of their half sum p(v)=(p(Y)+p(Z))/2 squared difference of their half sum p(v)=(p(Y)+p(Z))/2 from the average value of the pixels already included into R does not exceed the dispersion D of the noise present in the mentioned difference multiplied by some tolerance level L set by the user. If the pair of pixels passes the test, it is included into R (a first pair of pixels are added to the region). As long as the region R growths, the process continues with considering of pairs as described above (a second pair of pixels are added to the region). The process is stopped when no new pair of pixels passes the tests (the last pair of pixels are added to the region). Then the average pixel value over R is used as a value of pixel X in an image with reduced noise.

Better approximations of an optimal region R may be found in a similar way by inclusion of more tests for randomness of deviations of pixel values and tests for the presence near X of certain expected non-random details of the true image like thin lines. The found region R may be revised and made more dense and regular by inclusion into the region R of part of the internal points rejected in the first pass and by smoothing the borderline of the region R.

The region R must be symmetric to eliminate the distortion of the image due to contribution of the gradient of true image intensity into the average value.

The limitation of deviations of half sums of pixel values from the average value over R limits the distortion of the noise-reduced image due to the contribution of the curvature of the true image intensity by about $\sqrt{DL}/4$.

Generally, the region R is elongated in the direction of minimal curvature of the image intensity. For pixels X near the boundary of smooth fragments, the region R becomes narrow and may be reduced to a line.

Due to statistical uncertainty of the boundary between the region R and surrounding image fragments, the averaging over the region R does some smearing of the image. However, the range of such smearing is several times smaller than the range of the smearing in the usual noise filtering methods, which is of the order of the filter diameter.

The choice of the averaging region R symmetric with respect to X is usual for all filters making the noise reduction, since it makes the average closer to the true value than in case of an asymmetric region. The present invention discloses that the region R is optimized individually for each point X and that in the selection of this region only the half sums p(v) of pixel values at symmetrical points Y, Z are used instead of individual pixel values. This makes the process of choice of region R insensitive to the gradient of intensity of the true image. In particular, this property has the above-mentioned test written as the formula:

$$(p(v)-Avr_v(X))^2 < D(X,v)L,$$

where $Avr_v$, here denotes the average over all pixel pairs earlier included into R and D(X,v) stands for the dispersion of the difference $p(v)-Avr_v(X)$.

Dispersion $D(X,v) \sim D(X)*(1/2+1/n)$, where n is a number of pixels in R, may be known from different sources: from analysis of earlier images obtained with the same technology, from the number of photons registered in case of Poisson statistics of noise, or from the image itself by means of the formula $D(X,v)=Avr((p-Avr(p))^2)$, where p=p(v) and averaging is done over all pixel pairs earlier included in to R. The estimation of D(X) and D(X,v) may be done in many ways and is not an integral part of the invention.

The details of the algorithm picking up the pairs of pixels tested for possible inclusion into region R may be different and are not the integral part of the present invention. The process of checking is mentioned solely to give a general idea how the method may be realized. Actually, in a tested algorithm, the order, in which the pairs of pixels were tested, was fixed so as to allow the region R to grow continuously, by one-pixel layers of square shape until the deviation checks were positive. Every time when a new pair was added to the region R, the pixels touching to this pair were marked as possible extensions of R. The next picked pair of pixels was first checked for being marked. If it was unmarked, it was skipped without other more time-consuming tests. When none of the pixels in a next completed square layer passed the tests, the process of expansion of the region R stops.

The purpose of the additional checks for randomness of deviations is intended to clear the region R from compact groups of pixels (and their symmetrical partners) which pass the tests for individual pairs, but which deviate collectively too much to one side. If deviations are random, the squared deviation of the average of K half sums of pixel pairs from the true value $(P(X)-Avr_Kp(v))^2$ may only exceed $2D(X)/K$ in a few percent of cases. If a group of pixel pairs deviates more, its exclusion from the region R will most probably make the average over the region R closer to the pixel value P(X) of the true image. The check for the presence of certain suspected details is similar to the check above, but is more sensitive for deviation in groups of pixels of certain shapes.

The region R found in a one-pass process usually contains many holes, where most of the pixels do not deviate much, but at the time of their check during the first pass did not touch pixels already included into R. The revision of R with the account of points included afterwards and with slightly more liberal deviation test does not increase the size of R but makes it more solid.

The pixels in a borderline of a solid many-pixel region R should, normally, touch with 4 or 5 pixels belonging to this region. The rejection of peripheral points touching with less than 3 pixels belonging to the region R does not decrease significantly the number of pixels in the region R, but smoothes the borderline and decreases the risk of smearing distortions.

A second method of noise reduction using property (c) that the noise in the image is significantly correlated with the noise in other images will now be described.

The second method reduces noise at each point X of an image $I_1$, correlated with the noise at a corresponding point Y of an image $I_2$ with the variance-covariance matrix V for pixel values $p(X, I_1)$, $p(Y, I_2)$ by:

(1) obtaining from image $I_2$ a noise reduced image $I_3$ by any noise reduction method not using image $I_1$;
(2) calculating the estimate F(Y) given by the formula:

$$F(Y)=p(Y, I_2)-p(Y, I_3)$$

of the fluctuation of the pixel value at point Y;
(3) calculating the estimate $H(X, I_1)$ given by the formula:

$$H(X, I_1) = F(Y)\frac{V(p(X, I_1), p(Y, I_2))}{V(p(Y, I_2), p(Y, I_2))}$$

of fluctuation $G(X, I_1)$ of pixel value $p(X, I_1)$ in image $I_1$; and
(4) obtaining from image $I_1$ a noise reduced image $I_4$ by subtracting from each pixel value of image $I_1$ the estimate of its fluctuation, which is given by the formula:

$$p(X, I_4)=p(X, I_1)-H(X, I_1).$$

If the matrix V as a function of X is known, implementation is straightforward and reduces to repeating calculations (2), (3), and (4) for all pixels X.

If the matrix V is not given, its estimate at each point X may be found by a standard method as average values over a small region around the point X and corresponding region around the point Y of products of deviations of pixel values from their average values over the same regions.

The second method reduces in image $I_1$ only the part of its noise which is correlated with the noise in image $I_2$ and does not remove the part of noise in image $I_1$ which is independent from the noise in image $I_2$. So the maximal coefficient of noise reduction by the second method is limited by the difference $1-C^2$, where C is the correlation coefficient, which is given by the formula:

$$C = \frac{V(p(X, I_1), p(Y, I_2))}{\sqrt{V(p(X, I_1), p(X, I_1))V(p(Y, I_2), p(Y, I_2))}}.$$

If $C^2$ is close to 1.0, the noise reduction in image $I_4$ may be very deep. If $C^2$ is noticeably smaller than 1.0, image $I_4$ still contains noticeable independent noise. This noise may be reduced by applying to image $I_4$ other noise-reduction methods (including the first method).

The noise reduction by the second method has some specific consequence. It is related with the fact that image $I_3$ obtained from image $I_2$ contains smearing distortions. These distortions pass into estimates H and from them pass into the noise-reduced image $I_4$, where they look as a kind of shadows of boundaries of objects on image $I_2$.

Since images $I_1$, $I_2$ are different, the boundaries of image fragments in image $I_1$ and image $I_2$, generally do not coincide and shadows of boundaries of fragments of image $I_2$ do not smear details in image $I_4$. These shadows obscure details in image $I_4$ much less than the original noise in image $I_1$, so small details in image $I_1$, lost in the noise in image $I_1$, become visible after such noise reduction. By contrast, usual noise-reduction methods make small details less visible after noise reduction.

The intensity and widths of mentioned shadows of image $I_2$ in image $I_4$ depend on the choice of the method and parameters of noise reduction for image $I_3$. The optimal choice of noise reduction for image $I_2$ depends on the structure of images $I_1$ and $I_2$ and of preferences of the user of image $I_4$. The choice of the first method of the present invention for noise reduction in image $I_2$ is advantageous since it reduces the shadows of image $I_2$ obscuring the image $I_4$.

The noise remaining in image $I_4$ can be further reduced by many methods. A comparison of image, obtained from image $I_4$ after noise reduction by the first method, with a true clean image shows that, when the noise correlation is present, the combination of the second and the first method makes very deep noise reduction without noticeable distortions or smearing.

The roles of images $I_1$ and $I_2$ may be interchanged, so the noise may be reduced in image $I_2$ by the second method as well.

In an experiment with two artificially constructed images $I_1$, $I_2$, imitating images taken with high energy respective low energy X-rays, the noise was 95% correlated. To reduce noise in image $I_2$, the first method was used with an additional check sensitive to the systematic deviation of local intensity from the average one and reducing "shadows" of image $I_2$ in image $I_4$.

A comparison of image $I_4$ and noise-reduced image, obtained from image $I_1$ by the first method, gave the result that the first method is more efficient for large fragments (for background), while the second method is advantageous for small fragments and details.

A third method of noise reduction using properties (a), (b), (c), and property (d) that images are reconstructed from common source images (data) will now be described.

The third method reduces noise in images $I_1$ and $I_2$ reconstructed (computed) as known smooth functions $I_1 = a(S_1, S_2)$, $I_2 = b(S_1, S_2)$ from source images $S_1$, $S_2$ with independent noise of known dispersion by combination of the first and the second method modified to exploit images $S_1$, $S_2$ and functions a, b as follows:

(5) a noise reduced image $I_3$ is obtained from image $I_2$ by noise reduction by the first method, where the averaging region R is selected as the maximal region R around Y, which includes only the pairs of pixels symmetrically placed with respect to Y and; either having the sums of values deviating from each other within the limits corresponding to the level of the noise in the image and to a tolerance preferences of the user of the noise-reduced image; or corresponding to pairs of pixels in source images $S_1$, $S_2$ having the sums of values deviating from each other within the limits corresponding to the level of the noise in the images $S_1$, $S_2$ and to a tolerance preferences of the user of the noise-reduced image;

(6) the estimate F(Y) given by the formula:

$$F(Y) = p(Y, I_2) - p(Y, I_3)$$

of the fluctuation of the pixel value at point Y is calculated;

(7) the covariance matrix V for pixel values $p(X, I_1)$, $p(Y, I_2)$ at points X, Y on images $I_1$, $I_2$ is computed in linear approximation as given by the formulae:

$$V(p(X, I_1), p(X, I_1)) = \left(\frac{\partial a}{\partial S_1}\right)^2 D_1 + \left(\frac{\partial a}{\partial S_2}\right)^2 D_2,$$

$$V(p(X, I_1), p(Y, I_2)) = \left(\frac{\partial a}{\partial S_1}\right)\left(\frac{\partial b}{\partial S_1}\right)D_1 + \left(\frac{\partial a}{\partial S_2}\right)\left(\frac{\partial b}{\partial S_2}\right)D_2,$$

$$V(p(Y, I_2), p(Y, I_2)) = \left(\frac{\partial b}{\partial S_1}\right)^2 D_1 + \left(\frac{\partial b}{\partial S_2}\right)^2 D_2,$$

where $D_1$ and $D_2$ are the noise dispersions in images $S_1$, $S_2$ at points Z, T corresponding to point Y;

(8) the estimate $H(X, I_1)$ given by the formula:

$$H(X, I_1) = F(Y)\frac{V(p(X, I_1), p(Y, I_2))}{V(p(Y, I_2), p(Y, I_2))}$$

of fluctuation $G(X, I_1)$ of pixel value $p(X, I_1)$ in image $I_1$ is calculated; and (9) a noise reduced image $I_4$ is obtained from image $I_1$ by subtracting the estimate of fluctuation from each pixel value, wherein $P(X, I_4)$ is given by the formula:

$$p(X, I_4) = p(X, I_1) - H(X, I_1).$$

The relations $I_1 = a(S_1, S_2)$ and $I_2 = b(S_1, S_2)$ between images are pixel-wise, that is the point X on image $I_1$, corresponds uniquely to points Y, Z, T on images $I_2$, $S_1$, $S_2$ respectively. So, these relations can be written for pixels as given by the formulae:

$$p(X, I_1) = a(p(Z, S_1), p(T, S_2)),$$

$$p(Y, I_2) = b(p(Z, S_1), p(T, S_2)).$$

The implementation is straightforward and consists of performing operations (5)–(9) for all pixels of image $I_1$. The simplest implementation of point (5) is to check only the difference between the sum of values and the double value of a central pixel (the check is done both for image $I_1$, and for the source images $S_1$, $S_2$). The use of source images in the step (5) usually makes the quality of the region R found by the pixel-selection process described in the simplest implementation of the first method good enough without additional checks and boundary smoothing.

More advanced implementation of point (5) may check as well the deviation of the average source value from the average of the values of several pixel pairs touching the pixel pair in question. Such test locates more accurately the boundaries of the region R.

The most time-consuming step of the third method is the computation of the matrix V at all points. However, the ratio of its elements used in step (8) can be computed and tabulated beforehand as a two-argument function. In this case the computation of the matrix V is done quickly by interpolation and the whole noise reduction procedure takes about the same time as the calculation of image $I_1$ from images $S_1$, $S_2$.

The smooth fragments of the source images correspond to smooth fragments on reconstructed images (but not vice versa, since reconstructed images contain smaller number of details than the source ones). Since the source images have relatively small noise, their use helps to define reliably the part of the region R, which does not contain details of the true image able to distort the average value, and helps to reduce statistical uncertainties of the boundaries. This makes the third method applicable in cases of very noisy (reconstructed) images, for which all other methods of noise reduction become inefficient.

In cases of less noisy images, when different noise reduction methods are applicable, the third method makes smearing distortions in image $I_3$ smaller, and image $I_4$ cleaner from shadows of fragment boundaries in image $I_2$. These shadows may become even indistinguishable.

The squared correlation coefficient for reconstructed images often exceeds 0.90 and noise dispersion can be reduced in Image $I_4$ more than a dozen times, if matrix V is known accurately enough. The knowledge of reconstruction functions a, b gives the possibility to compute V and the ratio between fluctuations H and F more accurately than by analysis of images $I_1$, $I_2$ themselves and achieve the noise reduction close to the theoretical limit.

In an experiment of the third method, an image $I_1$ and an image $I_2$ were reconstructed from two source images of simulated X-ray pictures of the combination of bone and tissue.

Reconstruction greatly amplifies the small intensity-dependent noise present in a source image (image $S_1$, or $S_2$), so the noise in images $I_1$, $I_2$ was large and boundaries of fragments were smeared. This noise in $I_1$ was 95% correlated with the noise in $I_2$. In this case, difficult to the first method, the third method remained efficient and gave an image were the "shadows" of other image are noticeable, but the noise reduction is deep and small details are reproduced without any smearing.

Preferably, the methods of the present invention is performed by software code, located in the internal memory of a computer, and executed by a processor of that computer.

It will be obvious that the present invention may be varied in a plurality of ways. Such variations are not to be regarded as departure from the scope of the present invention. All such variations as would be obvious to one skilled in the art are intended to be included within the scope of the appended claims.

What is claimed is:

1. A method for reduction of noise in an image including a plurality of pixels, comprising averaging pixel values over a region comprising the steps of:
   adding a selected pixel to the region;
   grouping pixels adjacent the region in pairs, wherein the pixels of each pair being oppositely located with respect to said selected pixel;
   adding said pairs, pair by pair, to the region in dependence on that the squared difference of the selected pixel value from the pairs half sums of the average value of the pixels in the region, does not exceed the dispersion of the noise of said difference multiplied by a tolerance level;
   repeating said step of grouping and said step of adding said pairs until that, in said step of adding said pairs, the condition for adding said pairs is not fulfilled for any pair;
   averaging the pixel values of said region; and
   using the thus averaged pixel value for said selected pixel in reduction of noise in said image.

2. The method as claimed in claim 1, wherein said step of grouping excludes grouping of pixels previously being grouped in pairs.

3. The method as claimed in claim 1, wherein said step of adding said pairs excludes pairs that do not touch any of the pairs already included in said region.

4. The method as claimed in claim 1, wherein said method is performed a second time and wherein said step of grouping during said second time only includes pixels rejected during the first performance of said method.

5. The method as claimed in claim 1, wherein said step of adding said pairs is performed in dependence on that the squared difference of an average of pixel values in the region from the pairs half sum does not exceed the dispersion of said difference multiplied by a tolerance level.

6. A computer program product directly loadable into the internal memory of a computer, said computer program product comprising software code portions for performing the method as claimed in claim 1 when said computer program product is run on said computer.

7. A method for reduction of noise in an image including a plurality of pixels, comprising the steps of:
   obtaining a noise reduced value of a second pixel located in a second image;
   calculating an estimate of the fluctuation of said second pixel value;
   calculating an estimate of the fluctuation of a first pixel value located in a first image, wherein said fluctuation of said first pixel value is correlated to said fluctuation of said second pixel value;
   obtaining a noise reduced value of said first pixel by subtracting said estimate of the fluctuation of the first pixel value from said first pixel value; and
   using said noise reduced value of said first pixel in reduction of noise in said first image.

8. The method as claimed in claim 7, wherein the absolute value of said correlation is at least 0.8.

9. A computer program product directly loadable into the internal memory of a computer, said computer program product comprising software code portions for performing the method as claimed in claim 7 when said computer program product is run on said computer.

10. The method as claimed in claim 7, wherein said noise reduced value of said second pixel is obtained without use of said first image.

11. The method as claimed in claim 7, wherein said first image is reconstructed from a third image S1 and a fourth image S2 and said second image is also reconstructed from S1 and S2, and wherein said estimate of the fluctuation of said first pixel is calculated by the formula:

$$F(Y) \frac{V(p(X, I_1), p(Y, I_2))}{V(p(Y, I_2), p(Y, I_2))}$$

wherein F(Y) is the fluctuation of the second pixel and V is the covariance between pixel values p of the first pixel X in the first image $I_1$ and of the second pixel Y in the second image $I_2$, and wherein $V(p(X, I_1), p(Y,I_2))$ is estimated by the formula:

$$\left(\frac{\partial a}{\partial S_1}\right)\left(\frac{\partial v}{\partial S_1}\right)D_1 + \left(\frac{\partial a}{\partial S_2}\right)\left(\frac{\partial b}{\partial S_2}\right)D_2,$$

and V(p(Y,I$_2$),p(Y,I$_2$)) is estimated by the formula:

$$\left(\frac{\partial b}{\partial S_1}\right)^2 D_1 + \left(\frac{\partial b}{\partial S_2}\right)^2 D_2,$$

wherein a is a first function of S1 and S2, b is a second function of S1 and S2, D1 is the noise dispersion of a pixel in S1 corresponding to the second pixel Y, and D2 is the noise dispersion of a pixel in S2 corresponding to the second pixel Y.

12. A method for reduction of noise in an image including a plurality of pixels, comprising averaging pixel values over a first region around a selected pixel, comprising the steps of:

finding a second pixel corresponding to said selected pixel;

adding said second pixel to a second region;

grouping pixels adjacent the second region in pairs, wherein the pixels of each pair being oppositely located with respect to said selected pixel;

adding said pairs, pair by pair, to the second region in dependence on that the squared difference of the selected pixel value from the pairs half sums of the average value of the pixels in the region, does not exceed the dispersion of the noise of said difference multiplied by a tolerance level;

repeating said step of grouping and said step of adding said pairs until that, in said step of adding said pairs, the condition for adding said pairs is not fulfilled for any pair;

averaging the pixel values of the first region, which corresponds to the second region; and using the thus averaged pixel value for the selected pixel of said first region in reduction of noise in said image.

13. The method as claimed in claim 12, wherein said step of grouping excludes pixels previously grouped in pairs.

14. The method as claimed in claim 12, wherein said step dispersion is based on the region instead of said selected pixel.

15. The method as claimed in claim 12, wherein said step of adding said pairs is performed in dependence on that the squared difference of an average of pixel values in the region from the pairs half sum does not exceed the dispersion of said difference multiplied by a tolerance level.

16. The method as claimed in claim 12, wherein said second region is located in an image, which is different than the image wherein said first region is located.

17. The method as claimed in claim 12, wherein said noise reduced image is further noise reduced by the method of obtaining a noise reduced value of a second pixel located in a second image;

calculating an estimate of the fluctuation of said second pixel:

calculating an estimate of the fluctuation of a first pixel located in said first image, wherein said fluctuation of said first pixel is correlated to said fluctuation of said second pixel;

obtaining a noise reduced value of said first pixel by subtracting said estimate of the fluctuation of the first pixel from said first pixel; and using said noise reduced value of said first pixel in reduction of noise in said first image.

18. The method as claimed in claim 12, wherein said noise reduced image is further noise reduced by the method of adding a selected pixel to the region;

grouping pixels adjacent the region in pairs, wherein the pixels of each pair being oppositely located with respect to said selected pixel;

adding said pairs, pair by pair, to the region in dependence on that the squared difference of the selected pixel value from the pairs half sums of the average value of the pixels in the region does not exceed the dispersion of the noise of said difference multiplied by a tolerance level;

repeating said step of grouping and said step of adding said pairs until that, in said step of adding said pairs, the condition for adding said pairs is not fulfilled for any pair;

averaging the pixel values of said region; and using the thus averaged pixel value for said selected pixel in reduction of noise in said image.

19. A computer program product directly loadable into the internal memory of computer, said computer program product comprising software code portions for performing the method as claimed in claim 12 when said computer program product is run on said computer.

* * * * *